(12) United States Patent
Vandenberg, III et al.

(10) Patent No.: US 9,075,228 B2
(45) Date of Patent: Jul. 7, 2015

(54) OPTICAL QUICKMOUNT

(71) Applicant: Cellomics, Inc., Pittsburg, PA (US)

(72) Inventors: Dirk John Vandenberg, III, Wilkinsburg, PA (US); Keith R. Heffley, Pittsburgh, PA (US)

(73) Assignee: CELLOMICS, INC., Pittsburgh, PA (US)

( * ) Notice: Subject to any disclaimer, the term of this patent is extended or adjusted under 35 U.S.C. 154(b) by 259 days.

(21) Appl. No.: 13/734,748

(22) Filed: Jan. 4, 2013

(65) Prior Publication Data

US 2014/0192404 A1      Jul. 10, 2014

(51) Int. Cl.
*G02B 7/00* (2006.01)
*G02B 21/00* (2006.01)
*G02B 26/00* (2006.01)

(52) U.S. Cl.
CPC ......... *G02B 26/008* (2013.01); *Y10T 29/49826* (2015.01); *Y10T 29/49817* (2015.01)

(58) Field of Classification Search
CPC ............ G02B 26/008; Y10T 29/49826; Y10T 29/49817
USPC .................................. 359/368, 891, 892, 385
See application file for complete search history.

(56) References Cited

U.S. PATENT DOCUMENTS

| | | | |
|---|---|---|---|
| 3,844,661 A * | 10/1974 | Birkett et al. ................. | 356/414 |
| 6,791,767 B2 * | 9/2004 | Bonaventura ................. | 359/819 |
| 7,222,997 B2 * | 5/2007 | Rasmussen et al. .......... | 362/398 |
| 8,643,947 B2 * | 2/2014 | Nezu et al. .................... | 359/368 |
| 2004/0114219 A1 * | 6/2004 | Richardson .................... | 359/368 |
| 2012/0236398 A1 * | 9/2012 | Gugel et al. .................. | 359/368 |

FOREIGN PATENT DOCUMENTS

WO      WO 2004025329 A3 *   5/2004

OTHER PUBLICATIONS

ThorLabs V21 Catalog, p. 209, published at least as early as Oct. 2011.

* cited by examiner

*Primary Examiner* — Frank Font
(74) *Attorney, Agent, or Firm* — Workman Nydegger

(57) ABSTRACT

A filter wheel assembly includes a filter wheel and an optical assembly. The filter wheel includes a plurality of viewing openings. The optical assembly includes an optical element secured within an aperture of a housing. The optical assembly is securable to the filter wheel at a viewing opening by a magnetic force. An optical apparatus includes an optical assembly receiver and first and second optical assemblies. The first optical assembly is securable to the optical assembly receiver and the second optical assembly is securable to the first optical assembly by a magnetic force to align the optical assembly receiver and the optical assemblies. Methods of aligning apertures of optical assemblies with viewing openings of a filter wheel or an optical assembly receiver and securing the optical assemblies to the filter wheel or the optical assembly receiver using a magnetic force.

25 Claims, 12 Drawing Sheets

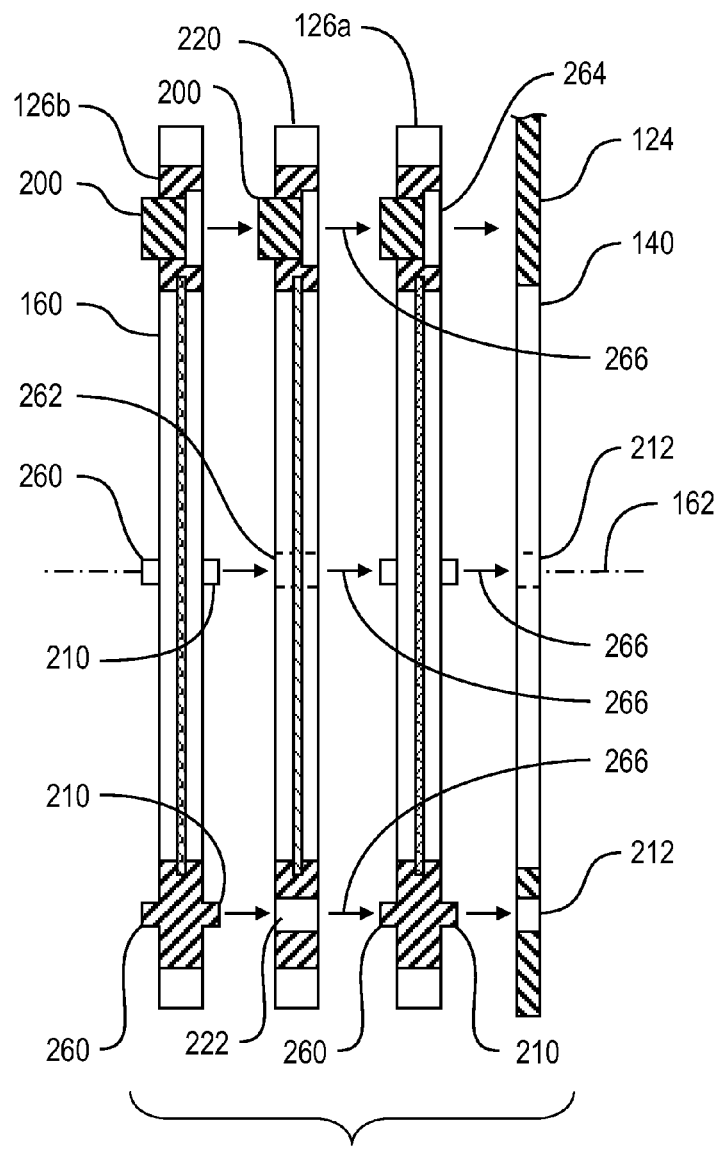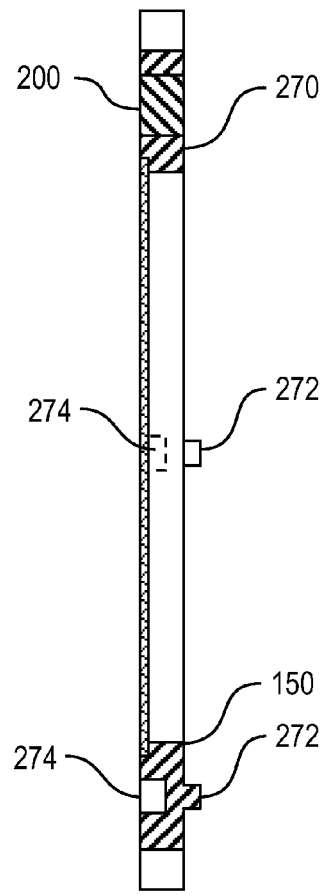
Fig. 10
Fig. 11

OPTICAL QUICKMOUNT

BACKGROUND OF THE INVENTION

1. The Field of the Invention

The present invention relates to quick release apparatuses and methods. Specifically, the present invention relates to quick release apparatuses and methods for installing and removing optical elements.

2. The Relevant Technology

High-content screening ("HCS") is a cell-based screening method that yields detailed information about the temporal-spatial dynamics of cell constituents and processes, and plays an important role in the use of cell-based screening for identification and validation of drug candidates. The information provided by HCS alleviates bottlenecks in the drug discovery process by providing deep biological information. The assays associated with this method use either fixed or live cells, depending on the biological information desired.

In one method of performing an HCS scan, the cells of interest are loaded into an array of wells in a standard specimen plate (also known as a titer or microtiter plate). The specimen plate is then positioned in a plate holder on a stage within an imaging system so that the specimen plate can move horizontally with the stage. The imaging system also includes a microscope. Motors are attached to the stage so that the stage and the specimen plate can be moved with respect to the microscope in both directions orthogonal to the microscope. As a result, any of the individual wells can be positioned in alignment with the microscope so as to be able to be imaged through the microscope objective.

The image obtained through the objective can be recorded using a camera system, such as, e.g., a Charge-Coupled Device (CCD) camera system. A wide variety of auxiliary components, such as electromechanical shutters and axial focus control mechanisms can be used to aid in obtaining and recording the images through the microscope. These components are typically interactively controlled by a computer using proprietary or commercially available image acquisition software.

Another useful component for automatic multi-color fluorescence imaging is a device for rapidly switching between different wavelengths of light. In a conventional configuration, a fluorescence filter set is housed in an optical block and contains an excitation filter and a barrier (or emission) filter, as well as a dichromatic mirror that directs excitation light to the specimen and transmits emission light to a detector in the camera system. For live-cell imaging using more advanced filter technology, the dichromatic mirror can be retained, but is often substituted for a polychromatic derivative that contains multiple bandpass regions. The excitation and emission filters can be removed from the optical block and placed in filter changers that can include a plurality of filter elements.

There are several practical mechanisms for automatically interchanging fluorescence filters. The most common involves rotating thin filter wheels having a number of filter elements mounted thereon. Filter wheels are reliable, relatively inexpensive, and supported by a large number of aftermarket and proprietary image acquisition programs. Among the major benefits of filter wheels are their high light transmission efficiency and the flexibility to use a wide range of commercially available filters.

One of the disadvantages of filter wheels is their limitation in switching speed. That is, it takes a finite amount of time to move between filter elements on the filter wheel. This can cause a significant delay to build up when imaging many cells, as is often done in HCS scans. To help mitigate this limitation, conventional filter wheels are thin and light and only accommodate up to about ten filter elements at a time. Although this helps mitigate the speed issue, it also causes other problems. For example, filter wheels must be manually changed out every time a filter element is desired that is not mounted on the filter wheel being used. This takes significantly more time than the delay caused by moving between filter elements on the filter wheel and thus greatly exacerbates the speed delay problems. Because only a few filter elements are mounted on a filter wheel, the changing out of filters wheels can occur often, especially due to the nature of fluoroscopy.

In some conventional configurations, the filter elements themselves are changed out instead of the filter wheel. To accommodate this, each filter element can be part of a filter that is threaded into an aperture formed on the filter wheel. Conventional filters include housings, adapters and retaining rings. A lens or filter element is placed inside the housing, which is usually circular, then held fast with an internal retaining ring. This sandwich of components, in turn, threads into the aperture on the filter wheel, often using an adapter to match the threading on the aperture. Because of the thinness of the filter wheel and the filter assembly, the threads are very thin and precise. As a result, a series of precise and costly threaded components are required on the filter components, along with special tools to change out the filters. In addition, the small size of the threads requires a dexterity on the part of the user, and special care must be taken during installation to not damage the components or the threads.

BRIEF DESCRIPTION OF THE DRAWINGS

Various embodiments of the present invention will now be discussed with reference to the appended drawings. It is appreciated that these drawings depict only typical embodiments of the invention and are therefore not to be considered limiting of its scope. In the drawings, like numerals designate like elements. Furthermore, multiple instances of an element may each include separate letters appended to the element number. For example two instances of a particular element "20" may be labeled as "20a" and "20b". In that case, the element label may be used without an appended letter (e.g., "20") to generally refer to every instance of the element; while the element label will include an appended letter (e.g., "20a") to refer to a specific instance of the element.

FIG. 10 is a cross sectional side view showing one embodiment of a filter wheel assembly in which a stack of filters are mounted on the filter wheel;

FIG. 11 is a cross sectional side view of an alternative embodiment of a filter that can be stacked on a filter wheel;

DETAILED DESCRIPTION OF THE PREFERRED EMBODIMENTS

Figure 1:
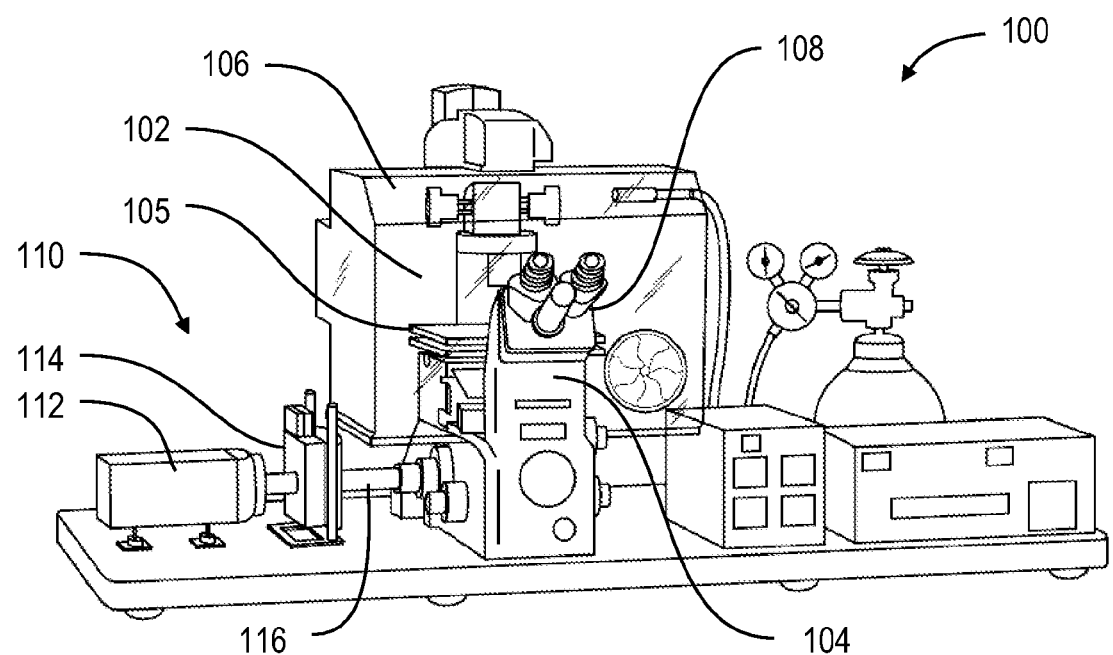
FIG. 1 is a perspective view of an imaging system incorporating features of the present invention.

In the following detailed description, reference is made to the accompanying drawings, which form a part hereof. In the drawings, similar symbols typically identify similar components, unless context dictates otherwise. The embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein. It will also be understood that any reference to a first, second, etc. element in the claims or in the detailed description, is not meant to imply numerical sequence, but is meant to distinguish one element from another unless explicitly noted as implying numerical sequence.

In addition, as used in the specification and appended claims, directional terms, such as "top," "bottom," "up," "down," "upper," "lower," "proximal," "distal," "horizontal," "vertical," and the like are used herein solely to indicate relative directions and are not otherwise intended to limit the scope of the invention or claims.

The present invention relates to apparatuses and methods that allow for quick and easy installation and removal of optical elements in an optical system. The apparatuses and methods are especially useful for frequently changed components such as filters on a filter wheel. Embodiments of the invention allow the components to be changed without the use of special tools (e.g., a spanner wrench), and eliminate the need for costly threaded components, such as retaining rings and element housings.

Embodiments of the invention provide a fundamentally different way of installing and removing optical elements. Instead of using physical retaining rings, as is conventionally used in the art, embodiments of the present invention use a magnetic force in combination with a means for aligning the optical element with a viewing opening to quickly mount and secure the optical element to an optical assembly receiver with acceptable precision and repeatability. For each optical element, a portion of the means for aligning can be incorporated into a housing to which the optical element is mounted to form an optical assembly. The other portion of the means for aligning can be positioned on the optical assembly receiver. The two portions of the means for aligning can cooperate with each other to quickly align the optical element of the optical assembly with the viewing opening of the optical assembly receiver while the magnetic force secures the optical assembly to the mounting location. For example, as discussed in more detail below, the optical assembly can comprise a filter and the optical assembly receiver can comprise a filter wheel to which the filter is quickly mounted and aligned using portions of the means for aligning positioned on the filter and the filter wheel.

To provide the magnetic force, one or more magnets can be positioned on or in the optical assembly or the optical assembly receiver or both. In addition or alternatively, the optical assembly and/or the optical assembly receiver can be made of or incorporate a magnet. A "magnet" is defined herein to be a material or object that produces a magnetic field, either permanent or electronically controlled. Furthermore, the optical assembly and/or the optical assembly receiver can be made of or incorporate a magnetic material, which is defined herein to be a material that is attracted to a magnet due to the magnetic field produced by the magnet.

Using the means for aligning and the one or more magnets to respectively align and secure the optical element of the optical assembly to the optical assembly receiver provides the precision necessary for mounting optical elements, in line with geometric dimensioning and tolerancing (GD&T) fundamentals. As a result, instead of using conventional threaded optical mounting assemblies, embodiments of the present invention eliminate the need for threaded components in such systems and allow for quick installation and removal of optical assemblies in optical assembly receivers.

According to embodiments of the present invention, a user can perform installation and removal of an optical assembly, such as a filter or a lens, to and from an optical assembly receiver, such as a filter wheel, without the use of tools, if desired. In some embodiments, the installation and/or removal can be easy enough to be performed without viewing the installation and/or removal. As a result, quick installation and removal of the optical assembly to and from the optical assembly receiver can be accomplished. This can remedy the common annoyance of slow installation and removal that plagues conventional optical assemblies, such as, e.g., filters to and from filter wheels, and other optical devices. In addition, by eliminating conventional threaded components, embodiments of the present invention generally cost less and are more resistant to damage that can occur with conventional products during installation and removal.

Once an optical assembly has been magnetically secured to the optical assembly receiver, the loaded optical assembly receiver can be employed in a conventional manner to allow the loaded optical assembly to be selected and positioned in the viewing path of a user or device of an optical system as desired, to manipulate the view. One example of such a system is an imaging system that uses filters or other optical assemblies to perform the imaging of one or more objects.

For example, depicted in FIG. 1 is an imaging system 100 that can incorporate features of the present invention. Imaging system 100 can be used to scan and analyze biological cells, as is known in the art. In some embodiments, imaging system 100 can be used for high content screening, as is also known in the art. Imaging system 100 is shown in FIG. 1 in a generalized live-cell imaging configuration.

Imaging system 100 comprises a stage assembly 102 mounted on a microscope assembly 104. Stage assembly 102 includes a stage 105 on which a slide or well plate can be positioned for viewing, as is known in the art. As shown in FIG. 1, stage assembly 102 can also include an environmental control chamber 106, if desired. Microscope assembly 104 houses an inverted microscope 108 that can be used to perform screening of specimens on the slide or well plate from underneath the specimens. Microscope 108 includes one or more objectives, as are known in the art, to obtain magnified views of the specimens.

Imaging system 100 can also include an image capture assembly 110 optically coupled to microscope 108 to record the image of the specimens obtained through the objective. Image capture assembly 110 can comprise a camera system 112 (e.g., a CCD camera system), an excitation filter assembly (not shown), an emission filter assembly 114, and one or more light tubes 116 that direct the emission light from the objective, through emission filter assembly 114 and to camera system 112, as is known in the art.

Figure 2:
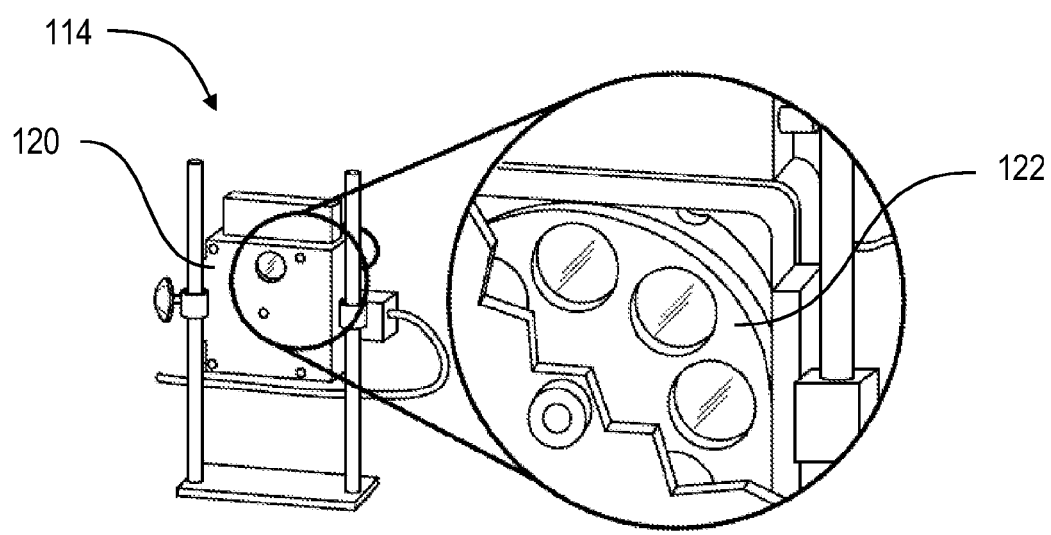
FIG. 2 is a perspective view of filter wheel station having an inset showing detail of a filter wheel assembly positioned within the filter wheel station.

FIG. 2 shows an exemplary filter assembly 114 that can be used as an excitation filter assembly or an emission filter assembly. Filter assembly 114 can comprise a housing 120 to which a filter wheel assembly 122 is mounted. Filter wheel assembly 122 can be an excitation filter wheel assembly or an emission filter wheel assembly, depending on how filter assembly 122 is going to be used. Filter assembly 114 can include a motor (not shown) for rotating filter wheel assembly 122 as well as hardware 123, e.g., fasteners, shafts, etc. for mounting the motor and filter wheel assembly 120 to housing 120 such that filter wheel assembly 122 can be rotated by the motor, in some embodiments under the direction of a controller, as is known in the art.

Figure 3A:
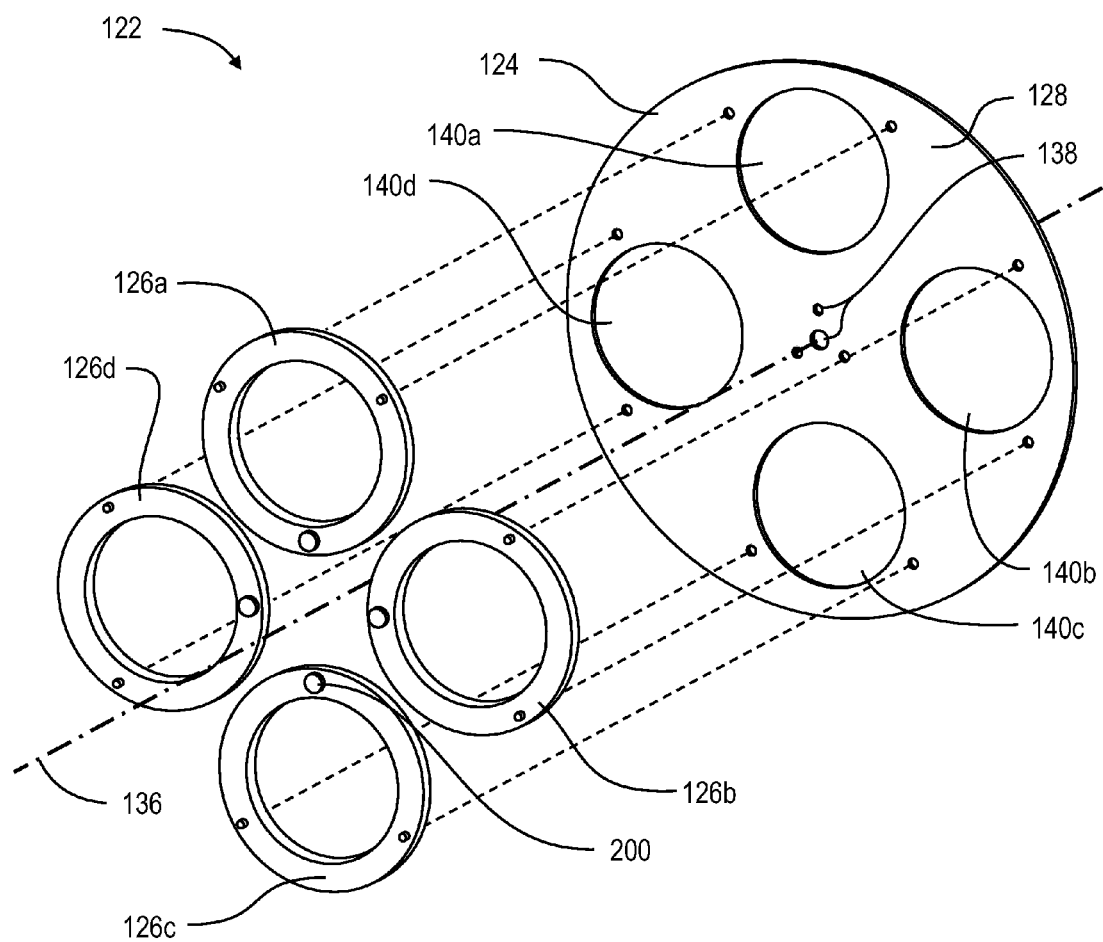
FIGS. 3A and 3B are perspective views of one embodiment of an optical apparatus—a filter wheel assembly comprising a plurality of filters mountable on a filter wheel, FIGS. 3A and 3B respectively showing the filter wheel assembly before and after the plurality of filters have been mounted to the filter wheel.
Figure 3B:
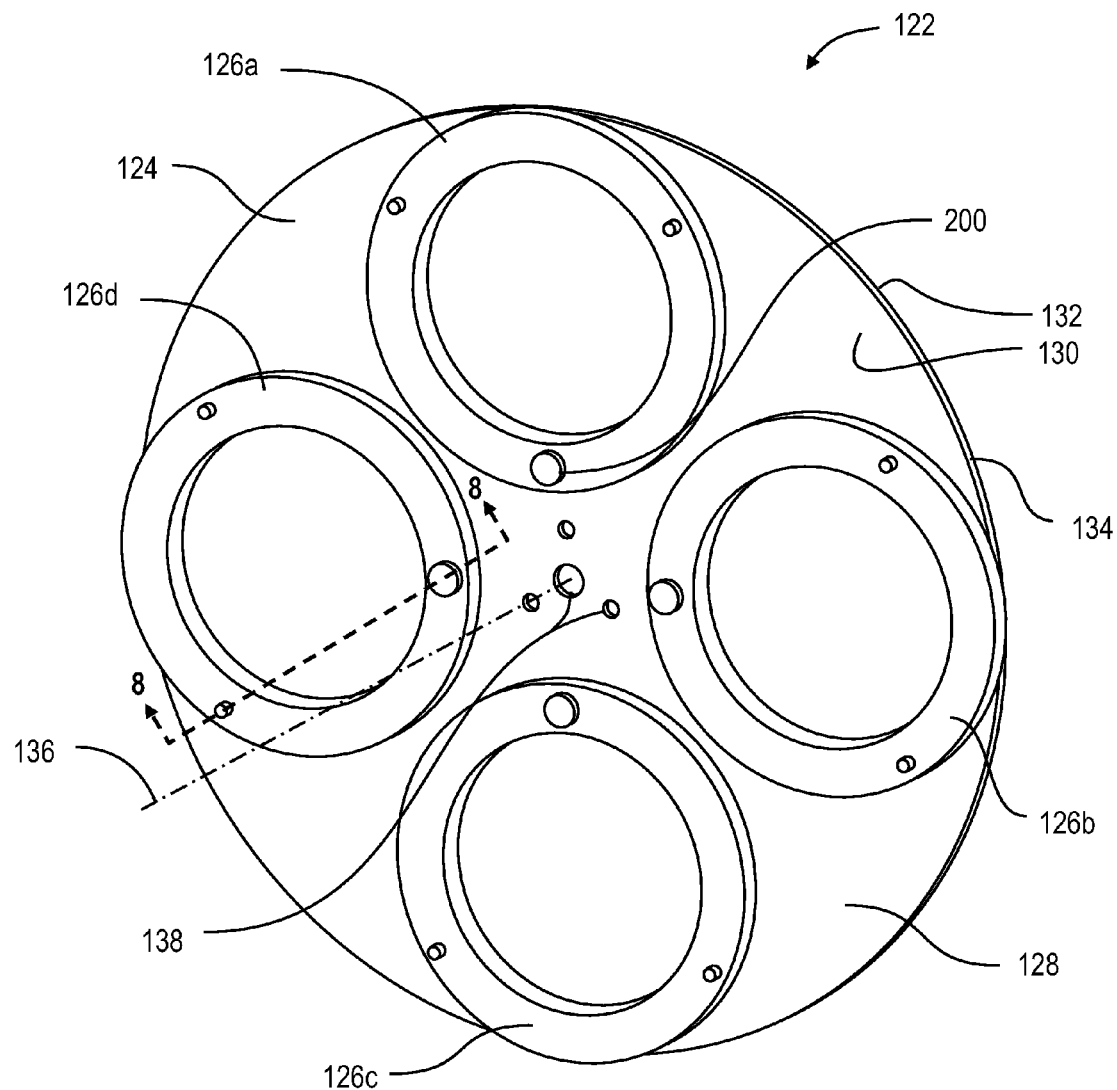

FIGS. 3A and 3B depict one embodiment of a filter wheel assembly 122 according to the present invention. Filter wheel assembly 122 comprises a filter wheel 124 to which a plurality of filters 126 (126a-d) are magnetically mountable. FIGS. 3A and 3B respectively show filter wheel assembly 122 before and after filters 126 have been mounted or secured to filter wheel 124. As shown in FIG. 3B, filters 126 can be secured to filter wheel 124 concurrently.

Filter wheel 124 corresponds to an optical assembly receiver of the present invention and comprises a main body 128 having a first face 130 and an opposing second face 132 with a perimeter sidewall 134 extending therebetween. Filter wheel 124 is generally circular, although this is not required. Filter wheel 124 has a central rotational axis 136 that passes through main body 128 and is generally orthogonal to first and second faces 130, 132; it is about this central rotational axis 136 that filter wheel 124 is rotated during use by the motor within filter wheel station 120. Filter wheel 124 is generally thin to allow for quick rotation about central rotational axis 136. Filter wheel 124 can be any diameter (if circular) or any other size commonly used in the art. For example, filter wheel 124 can have a diameter of between about 5 cm to about 25 cm, with about 10 cm to about 20 cm being common. Of course other diameters are also possible.

Filter wheel 124 can be comprised of any material to which filters 126 can be releasably mounted and that can withstand the forces placed on filter wheel 124 by rotation about central rotational axis 136 caused by the motor. To allow each filter 126 to be magnetically secured thereto, filter wheel 124 can include one or more magnets positioned thereon or therein, as discussed in more detail below. Alternatively or in addition, filter wheel 124 can be comprised of a magnetic material, such as a ferrous metal.

Main body 128 includes one or more mounting holes 138 formed thereon to aid in mounting filter wheel 124 to filter wheel station 120. Mounting holes 138 can be used to receive a shaft of the motor as well as other controlling devices, as is known in the art.

Figure 4:
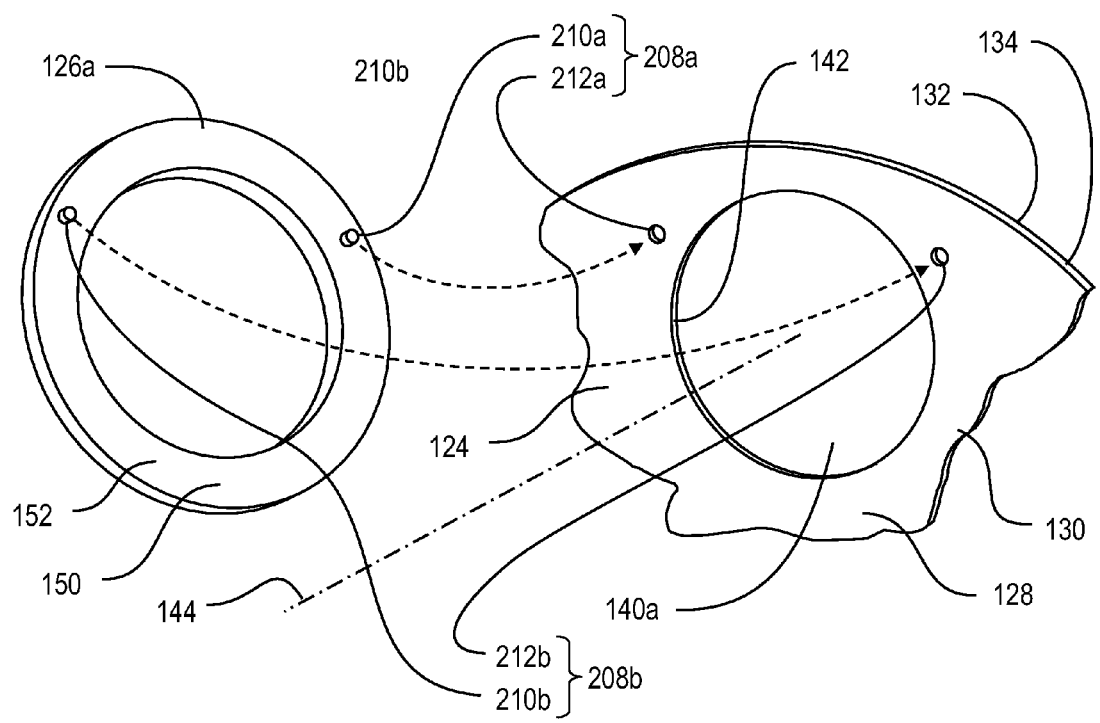
FIG. 4 is a perspective view of one of the filters and a portion of the filter wheel assembly of FIGS. 3A and 3B, showing how the filter is mounted to the filter wheel.

A plurality of viewing openings 140 (140a-d) are also formed in main body 128 so as to extend therethrough. As shown in FIG. 4, each viewing opening 140 is bounded by an inner sidewall 142 extending between first and second faces 130, 132 of main body 128. Viewing opening 140 is generally circular about a central axis 144 substantially parallel to rotational axis 136. Viewing opening 140 can have a size commonly used in the art. For example, viewing opening 140 can have a diameter of between about 1 cm to about 8 cm, with about 2 cm to about 5 cm being common. Other shapes and sizes are also possible.

As shown in FIG. 3A, viewing openings 140 are positioned on filter wheel 124 so as to be radially spaced about central rotational axis 136. As a result, as filter wheel 124 is rotated about central rotational axis 136, each viewing opening 140, in turn, can be rotated to a position that aligns the viewing opening 140 with the imaging path, as is known in the art, to use the filter 126 mounted at the corresponding viewing opening 140.

Any number of viewing openings 140 can be formed on the filter wheel 124. In the depicted embodiment, four viewing openings 140a-d are formed on filter wheel 124. In other embodiments, more or less viewing openings 140 can be formed. For example, the number of viewing openings 140 on filter wheel 124 can range from two to sixteen with four to eight being common. Of course, other numbers of viewing openings 140 can also be used.

Figure 5:
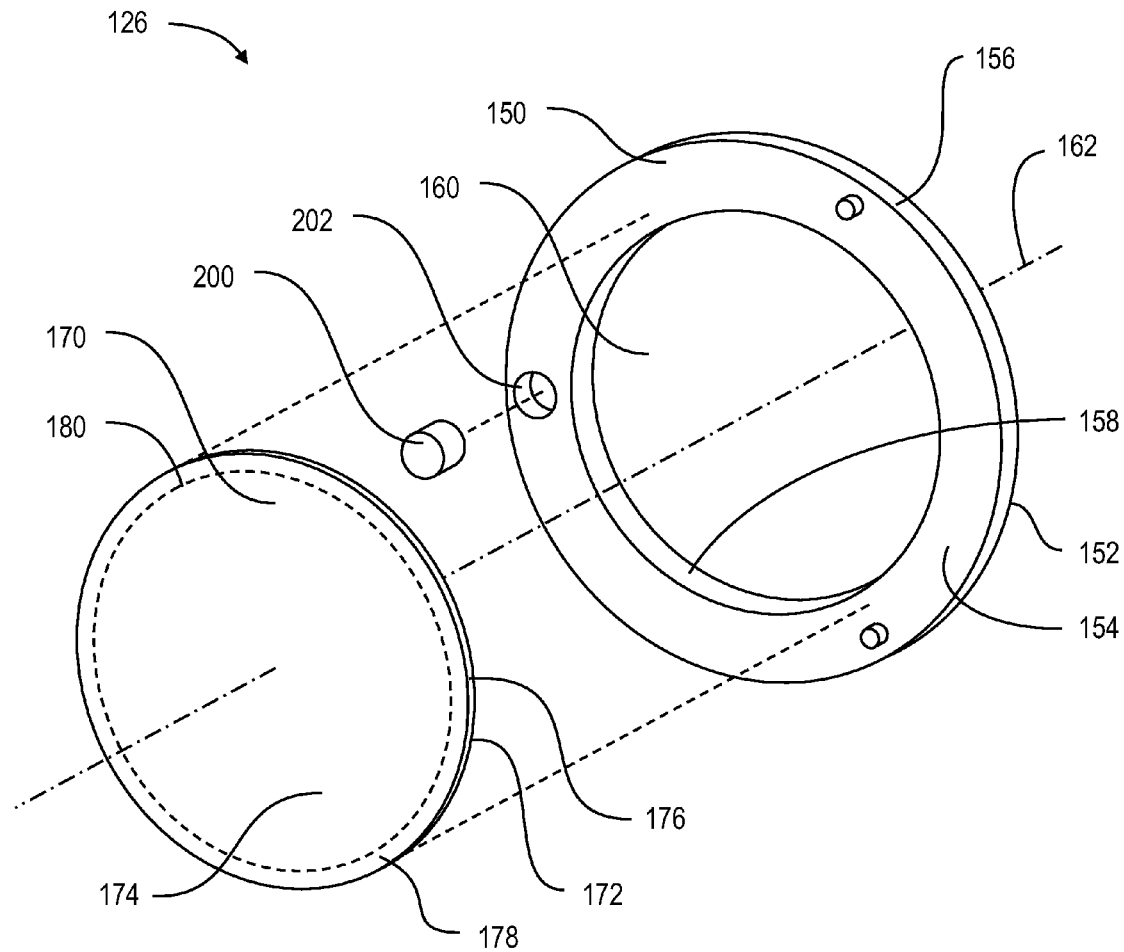
FIG. 5 is an exploded perspective view of one of the filters shown in FIGS. 3A and 3B.

As shown in FIGS. 3A and 3B, filter wheel 124 can have a separate filter 126 mounted thereto at each viewing opening 140. As noted above, filter 126 corresponds to an optical assembly of the present invention. Turning to FIG. 5 in conjunction with FIG. 4, each filter 126 comprises a housing 150 shaped and sized so as to be positionable at any of viewing openings 140 of filter wheel 124. As such, housing 150 is generally ring-shaped, having a first side surface 152 and an opposing second side surface 154 with an outer perimeter wall 156 and an inner perimeter wall 158 extending between the opposing side surfaces 152, 154.

Inner perimeter wall 158 bounds an aperture 160 that is generally circular about a central axis 162 substantially orthogonal to first and second side surfaces 152 and 154. Aperture 160 is sized to be approximately the same size as viewing opening 140, but may be larger or smaller than viewing opening 140. As such, the same ranges of sizes discussed above with respect to viewing opening 140 can also generally apply to aperture 160. In one embodiment, the diameter of aperture 160 is substantially the same as the diameter of viewing opening 140.

Housing 150 is generally sized and shaped to overlap viewing opening 140 so that housing 150 can mount to the portion of main body 128 that encircles viewing opening 140. As such, the outer perimeter of housing 150 can also be generally circular about central axis 162, with the diameter of outer perimeter wall 156 being greater than the diameter of viewing opening 140. Although housing 150 and aperture 160 are discussed as being generally circular, other shapes are also possible, as long as aperture 160 can be aligned with viewing opening 140 while housing 150 overlaps viewing opening 140 to be mounted to main body 128 of filter wheel 124.

As shown in FIG. 5, filter 126 further includes an optical element 170 secured to housing 150 so as to cover or be positioned within aperture 160. Optical element 170 has a first face 172 and an opposing second face 174 with a perimeter sidewall 176 extending therebetween at a perimeter portion 178 of optical element 170. Optical element 170 is generally sized and shaped to fully cover or fill aperture 160. As such, optical element 170 can have a diameter that is slightly larger than the diameter of aperture 160. Optical element 170 can be made of glass, plastic, or other optical material now known in the art or envisioned in the future. Optical element 170 can comprise a filtering component or other optical component. Some examples include: relay or magnification lenses, bandpass, edgepass and notch filters, neutral density filters, dichroics, beamsplitters, diffraction gratings, apertures, diffusers.

Optical element 170 is typically permanently secured to housing 150, although optical element 170 can alternatively be removable, if desired. Optical element 170 can be secured to housing 150 in a number of different ways. In one embodiment, optical element 170 is attached to housing 150 using adhesive or welding techniques known in the art. For example, first face 172 of optical element 170 can be adhered to second side surface 154 of housing 150, as shown in the depicted embodiment. Alternatively, second face 174 of optical element 170 can be adhered to first side surface 152 of housing 150. In those embodiments, outer perimeter portion 178 (the portion of optical element 170 radially outside of dashed line 180) overlaps housing 150 so as to be adhered to housing 150. Alternatively, outer perimeter 178 of optical element 170 can be secured to housing 150 using fasteners, such as set screws or the like. Other attachment techniques may also be used, as is known in the art.

Figure 6A:
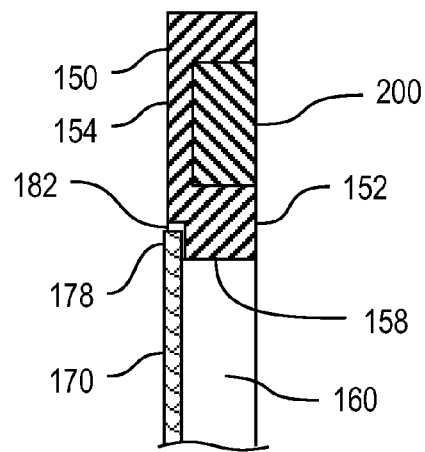
FIGS. 6A-6C are cross sectional side views of alternative embodiments of filters.
Figure 6B:
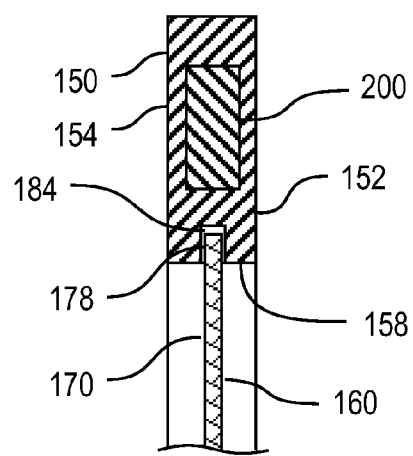
Figure 6C:
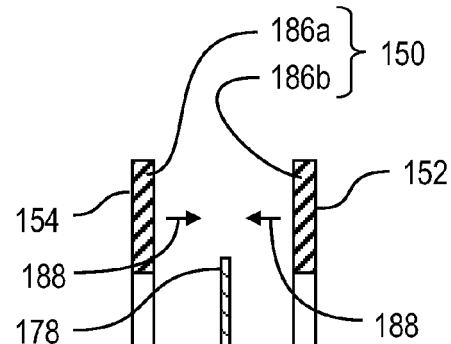
Figure 6C:
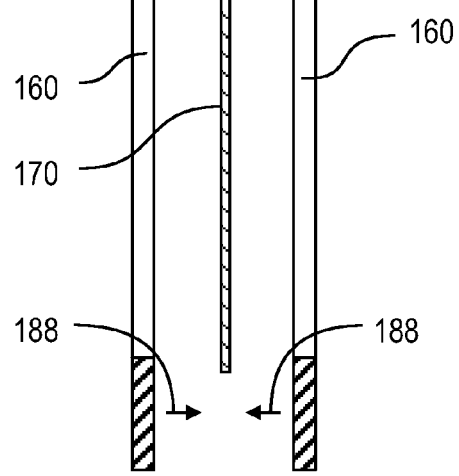

FIGS. 6A-6C show alternative manners of securing optical element 170 to housing 150. In FIG. 6A, an annular groove 182 is formed on one of the side surfaces (second side surface 154 in the depicted embodiment) of housing 150. Groove 182 is formed where side surface 154 intersects inner perimeter wall 158 so as to encircle aperture 160. Outer perimeter portion 178 of optical element 170 is secured within annular groove 182. In FIG. 6B, an annular channel 184 is formed on inner perimeter wall 158 of housing 150 between side surfaces 152 and 154. Optical element 170 is positioned within aperture 160 so that outer perimeter portion 178 of optical element 170 is positioned within annular channel 184 and secured therein. In FIG. 6C, housing 150 is comprised of two halves 186a and 186b that are adhered or otherwise secured together to form housing 150. Optical element 170 can be positioned between halves 186a and 186b before assembly of housing 150 so that optical element 170 is secured within housing 150 when halves 186a and 186b are brought together, as denoted by arrows 188, to form housing 150. If desired, an annular groove can be formed in each half 186 so that when halves 186 are brought together, the grooves together form an annular channel, similar to channel 184 of FIG. 6B in which optical element 170 is positioned. Other manners of securing optical element 170 to housing 150 are also possible.

As noted above, the optical assemblies can be magnetically secured to the optical assembly receiver. To do so, one or more magnets can be used to produce the magnetic field required to generate the magnetic force necessary to secure the optical assembly to the optical assembly receiver. For example, returning to FIG. 5, as an optical assembly, filter 126 can include a magnet 200 secured to housing 150 or formed therewith.

Magnet 200 can be adhered or attached to first or second side surface 152, 154. Alternatively, a mounting hole 202 can be formed on housing 150 to receive magnet 200, as in the depicted embodiment. Mounting hole 202 can be formed on first side surface 152 or second side surface 154 or can extend all the way through housing 150 between the two surfaces. Magnet 200 can be friction fit within mounting hole 202, be adhered therein, or a combination of both. Alternatively, magnet 200 and mounting hole 202 can be threaded so that magnet 200 can be screwed into mounting hole 202. In some embodiments, one or more fasteners, such as, e.g., set screws or the like, can be used to secure magnet 200 within mounting hole 202. Other methods of mounting and securing magnet 200 can also be used.

In one embodiment, magnet 200 can be incorporated into housing 150 so as to be substantially flush with either of side surfaces 152, 154 (see, e.g., FIG. 6A) or completely embedded within housing 150 (see, e.g., FIG. 6B).

Figure 7A:
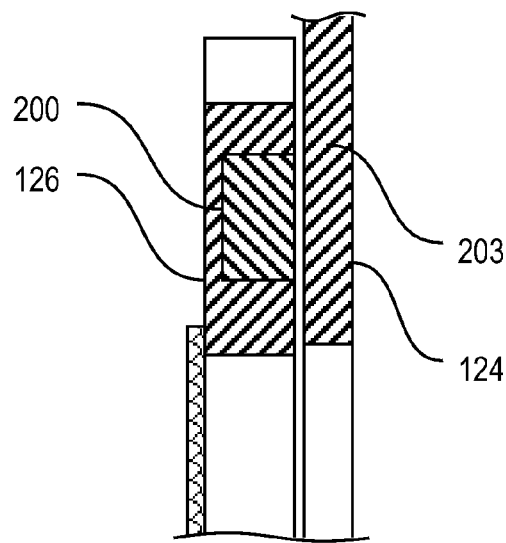
FIGS. 7A-7D are cross sectional side views of a portion of a filter mounted onto a filter wheel showing alternative arrangements of magnets and magnetic material.
Figure 7B:
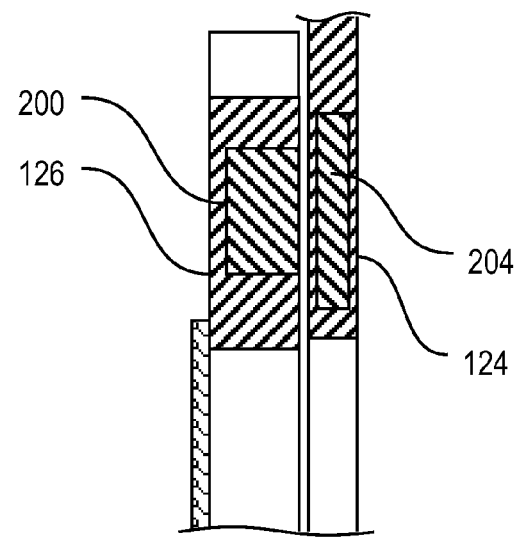

For a magnetic force to be generated that is sufficient to secure the optical assembly to the optical assembly receiver, all or portions of the optical assembly receiver can be comprised of or incorporate a magnetic material that is attracted to the magnet. For example, as discussed above, main body 128 of filter wheel 124 can be comprised of a metal or other magnetic material 203 that is attracted to magnet 200, as depicted in FIG. 7A. Alternatively, the optical assembly receiver can be made of a non-magnetic material but can incorporate magnetic material in portions thereof. For example, FIG. 7B shows an embodiment in which an insert 204 comprised of magnetic material is used in filter wheel 124. Inserts 204 can be positioned within filter wheel 124 so as to generally align with magnets 200 when filters 126 are secured to filter wheel 124.

Figure 7C:
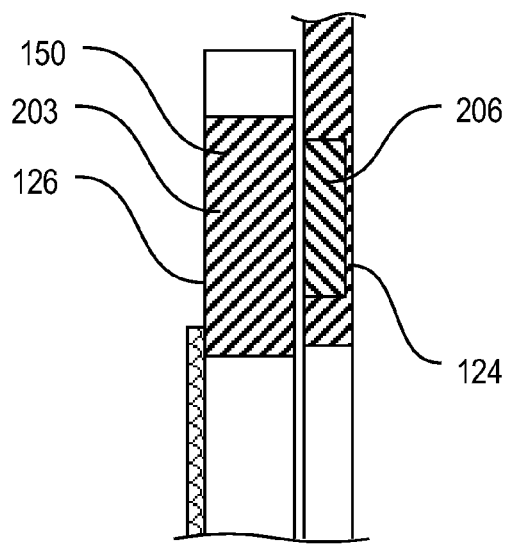

Alternatively, or in combination, the optical assembly receiver can incorporate one or more magnets. For example, FIG. 7C shows an embodiment in which a magnet 206 is incorporated into filter wheel 124 instead of into filter 126. In this embodiment, all or portions of housing 150 can be comprised of or incorporate magnetic material 203 that is attracted to magnet 206. Magnet 206 can be attached to or incorporated into filter wheel 124 in a similar manner discussed above with respect to magnet 200 of housing 150.

Figure 7D:
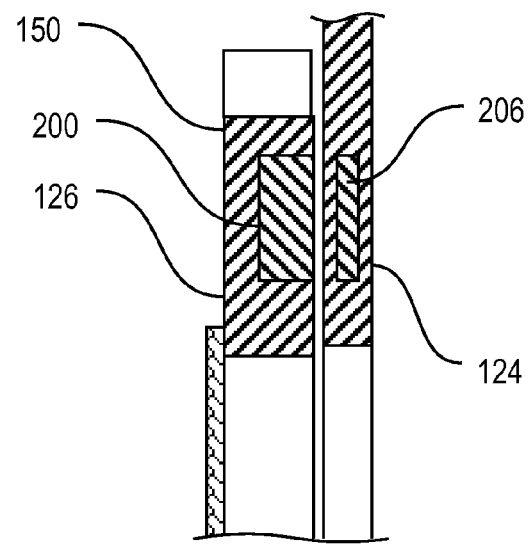

FIG. 7D shows an embodiment in which housing 150 and filter wheel 124 respectively include magnets 200 and 206. For maximum affect, magnets 200 and 206 can be located so as to be aligned (i.e., opposing each other) when filter 126 is mounted onto filter wheel 124. Using opposing magnets on filter 126 and filter wheel 124 can enhance the magnetic force therebetween, thereby allowing smaller magnets to be used to generate the same magnetic force as when only using a single magnet. When opposing magnets 200 and 206 are used, the poles of magnets 200 and 206 that face each other should be oppositely charged to attract each other. Otherwise, magnets 200 and 206 will repel each other, thereby preventing filter 126 from becoming secured to filter wheel 124.

In an alternative embodiment, either one of the housing and the filter wheel can be entirely or substantially, i.e., more than 50%, made of a magnet material and the other one can be comprised of a magnetic material attracted to the magnet material. Alternatively, both the housing and the filter wheel can be entirely or substantially made of a magnet material. If enough magnet material is used to make the housing and/or the filter wheel, a separate magnet may not be needed; the magnet material may provide the magnetic field necessary to produce the magnetic force to secure the filter to the filter wheel.

Magnets 200 can be of any practical size and shape to provide the magnetic force required to secure the optical assembly to the optical assembly receiver. In one embodiment, each magnet 200 is circular and has a diameter in a range of between about 3 mm to about 20 mm, with about 6 mm to about 12 mm being common. In some embodiments, each magnet 200 has a diameter that is less than 20 mm. Other diameters are also possible. In some embodiments, one or more magnets 200 are square, rectangular, oval, or any other regular or irregular shape. The thickness of magnets 200 can also depend on the magnetic force required. In one embodiment, the thickness of each magnet 200 is less than or equal to the thickness of filter wheel 124. Other thicknesses are also possible. Magnets 200 can be made of any magnet material, such as neodymium, alnico or ferrite. Other materials can also be used for magnets 200.

The magnetic pull force $F_p$ required to secure the optical assembly to the optical assembly receiver can vary, depending on the size, shape, weight, and composition of the optical assembly, as well as other factors. The magnetic force is also directly dependent on the magnetic field B of magnet 200. In one embodiment, $F_p$ of magnet 200 ranges between about 1 N and about 35 N with about 10 N and about 20 N being common. Other values of $F_p$ are also possible.

Most of the discussion and examples above are directed to the use of a single magnet (e.g., magnet 200) on the optical assembly, a single magnet (e.g., magnet 206) on the optical assembly receiver, or a corresponding magnet pair on the optical assembly and the optical assembly receiver. However, it should be appreciated that a plurality of magnet and/or magnet pairs can also be used. For example, two, three, four, or more magnets and/or magnet pairs can be used on filter 126 and/or filter wheel 124, if desired. Each of the magnet and/or magnet pairs can be spaced around the perimeter of housing 150 and/or the portion of main body 128 that encircles viewing opening 140. In addition, each of the magnets can be secured to housing 150 or filter wheel 124 in a same manner as each other or can be secured differently from each other. For example, a magnet can be embedded within housing 150 and another magnet attached to an outer surface thereof, if desired. Of course, other magnet arrangements can also be used.

As noted above, means can be used for aligning the optical element of the optical assembly with a viewing opening of the optical assembly receiver. These means can be used in conjunction with the magnetic force to quickly mount and secure optical elements to an optical assembly receiver. Also as noted above, portions of the means for aligning can be incorporated into the housing to which the optical element is mounted as well as the optical assembly receiver. As discussed above, in some embodiments, such as filter wheel assembly 122, the optical assembly can comprise a filter, and the optical assembly receiver can comprise a filter wheel. As such, in those embodiments, the means for aligning the optical element of the optical assembly with a viewing opening of the optical assembly receiver is synonymous with means for aligning the optical element of the filter with a viewing opening of the filter wheel, and portions of the means for aligning can be incorporated on the filter and the filter wheel In filter wheel assembly 122, the means for aligning the optical element of the optical assembly with a viewing opening of the optical assembly receiver can comprise a plurality of first coupling portions positioned adjacent one of the viewing openings 140 of main body 128 and a plurality of second coupling portions positioned on housing 150 that are complementary to the first coupling portions so that when the optical assembly (i.e., filter 126) is secured to the optical assembly receiver (i.e., filter wheel 124), the second coupling portions couple with the first coupling portions.

Figure 8A:
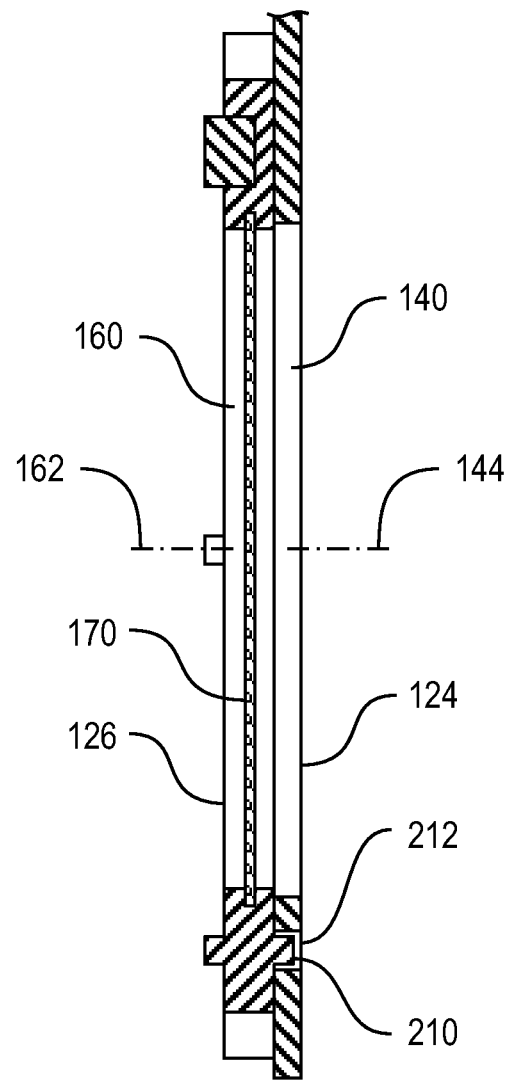
FIG. 8A is a cross sectional side view showing one of the filters mounted to the filter wheel, taken along the section line 8-8 of FIG. 3B.

In one embodiment, the means for aligning can comprise mating pairs of tenons and mortises positioned on the optical assembly and the optical assembly receiver. For example, as shown in FIG. 4, filter 126 can include two mating pairs 208 (208a-b) that each comprise a pin 210 (210a-b) formed in or attached to housing 150 that can be snugly received within a corresponding hole 212 (212a-b) formed in main body 128 of filter wheel 124 about each viewing opening 140. As such, mating pair 208a comprises pin 210a and corresponding hole 212a and mating pair 208b comprises pin 210b and corresponding hole 212b. As shown in FIG. 8A, pin 210 is a tenon and hole 212 is a mating mortise when filter 126 is aligned and mounted to filter wheel 124. Holes 212 can extend completely through housing 150 or a portion thereof.

The mating tenon/mortise pairs can be positioned so that the central axis of the viewing opening is aligned or collinear with the central axis of the aperture when the optical assembly is mounted to the optical assembly receiver. This ensures that the optical element and the viewing opening are aligned when the optical assembly is mounted to the optical assembly receiver. For example, in the embodiment shown in FIG. 8A, as filter 126 is mounted to filter wheel 124, pins 210 are received within holes 212 such that central axis 162 of aperture 160 becomes aligned with central axis 144 of viewing opening 140. This ensures that optical element 170 and viewing opening 140 are aligned.

Besides aligning optical element 170 with viewing opening 140, tenon/mortise pairs 208 can also prevent optical element 170 from becoming unaligned with viewing opening 140. When two or more pins 210 are received within their corresponding holes 212, filter 126 cannot rotate or otherwise move with respect to filter wheel 124. In contrast, if only one tenon/mortise pair 208 was used, filter 126 might be able to rotate with respect to filter wheel 124 using the single tenon/mortise pair as a pivot point. If this were to occur, optical element 170 would become unaligned with viewing opening 140. Thus, using only a single tenon/mortise pair 208 is generally not desired. However, if the shape of the tenon/mortis pair is not radially symmetrical, such as, e.g., elliptical, square, rectangular, or irregular, the shape may prevent the filter assembly from rotating and a single tenon/mortise pair may be enough to prevent rotation.

In one embodiment, however, the magnet can be used as a tenon with a corresponding recess positioned to receive the magnet used as a mortise (see, e.g., magnets 200 and recesses 264 of FIG. 10). In that case a single pin/hole combination 208 can be used with the magnet/recess combination to provide two tenon/mortise pairs, which can allow for correct rigid alignment of the optical element with respect to the viewing opening. More than two tenon/mortise pairs can also be used if desired, although this is not necessary.

Figure 8B:
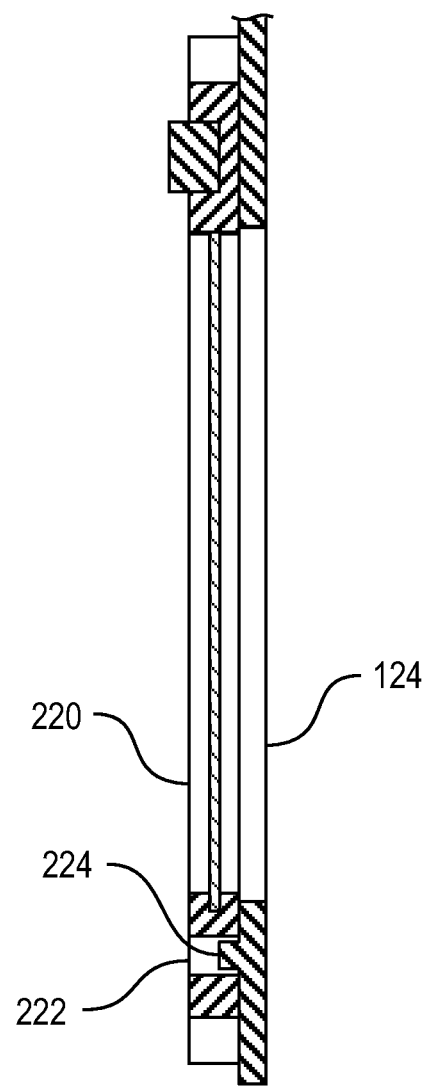
FIG. 8B is a cross sectional side view showing an alternative embodiment of a filter mounted to a filter wheel.

Although the discussion above relates to tenons on the optical assembly and corresponding mortises on the optical assembly receiver, it is appreciated that the opposite is also possible. That is, tenons can be positioned on the optical assembly receiver and mortises can be positioned on the optical assembly. For example, FIG. 8B depicts an alternative embodiment of a filter 220 having holes 222 formed therein instead of pins. Accordingly, main body 128 of filter wheel 124 has pins 224 attached to or formed thereon that can mate with holes 222.

It is appreciated that other types of means for aligning besides tenons and mortises can also be used. For example one or more fasteners, such as clips, screws, or other type of fasteners can be used as a means for aligning the optical element with the viewing opening. Alternatively, the means for aligning can comprise one or more channels and mating flanges positioned on the optical assembly, e.g., filter, and the optical assembly receiver, e.g., filter wheel. Other types of means for aligning can also be used.

An optical assembly can be mounted and removed from an optical assembly receiver with relative ease by simply aligning the tenon/mortise pairs and pushing the optical assembly onto the optical assembly receiver. An exemplary method of mounting and securing an optical assembly to an optical assembly receiver will now be set forth with reference to FIG. 9.

The first step of the method comprises aligning an aperture of the optical assembly with a viewing opening of the optical assembly receiver so as to align first coupling portions on the optical assembly with mating second coupling portions on the optical assembly receiver.

Figure 9:
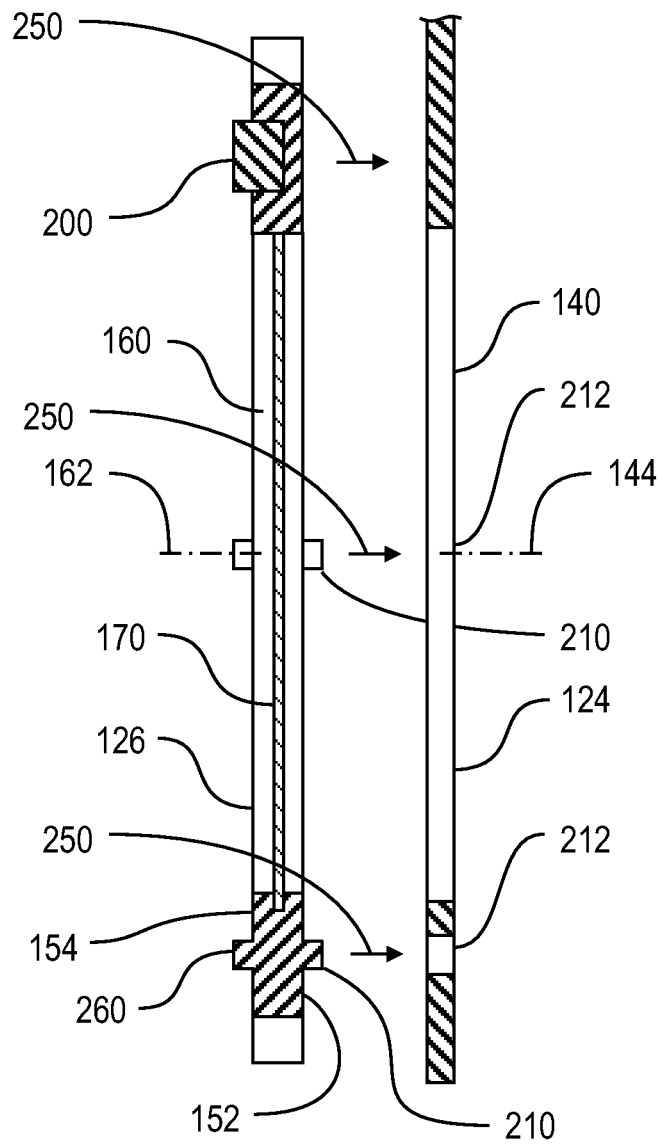
FIG. 9 is a cross sectional side view illustrating how a filter can be mounted to a filter wheel.

Referring to FIG. 9, this step can be performed by positioning filter 126 (an optical assembly) over one of the viewing openings 140 of filter wheel 124 (an optical assembly receiver) and rotating filter 126, if necessary, until mating pins 210 and holes 212 (first and second coupling portions) become aligned. Using lead-in chamfers in pins 210 and/or holes 212 will help guide the filter assembly onto the filter wheel.

The second step of the method comprises while the first and second coupling portions are aligned, moving the optical assembly closer to the optical assembly receiver until the first coupling portions couple with the second coupling portions and a magnetic force secures the optical assembly to the optical assembly receiver.

Again referring to FIG. 9, this step can be performed by moving filter 126 toward filter wheel 124, as indicated by arrows 250, until pins 210 are received within mating holes 212 and the magnetic force between magnet 200 and the magnetic material causes filter 126 to be secured to filter wheel 124.

Because of the ease by which the method can be done, the mounting and securing of the optical assembly to the optical assembly receiver may be accomplished quickly and easily without the use of any tools. Of course, the above method can be adapted based on the means for aligning that is used.

If the optical assembly receiver is designed to have more than one optical assembly concurrently secured thereto, the steps discussed above can be repeated to mount the rest of the optical assemblies to the optical assembly receiver. For example, multiple filters 126 can be concurrently mounted and secured to filter wheel 124 by repeating the steps discussed above for each filter 126.

Removing or dismounting an optical assembly from an optical assembly receiver can also be performed with relative ease. The optical assembly can be manually grasped and pulled away from the optical assembly receiver to overcome the magnetic force securing the optical assembly to the optical assembly receiver.

For example, referring to FIG. 9, filter 126 can be manually grasped and pulled away (i.e., in the opposite direction as arrows 250) from filter wheel 124 with sufficient force to overcome the magnetic force securing filter 126 to filter wheel 124. Once the magnetic force is overcome, filter 126 moves away from filter wheel 124, causing pins 210 to exit holes 212 so that filter 126 disengages from filter wheel 124. Similar to the mounting and securing method discussed above, removing or dismounting filter 126 may be accomplished quickly and easily without any tools due to the ease by which the removal is accomplished.

In some embodiments, optical assemblies can be stacked on the optical assembly receiver so the light can pass through all of the stacked optical assemblies. For example, FIG. 10 depicts an embodiment in which three filters (126a, 126b, and 220) can be stacked on filter wheel 124 so that central axes 162 of all of the filters align. As such, when the stacked filters are secured to filter wheel 124, central axes 162 of the filters and central axis 144 of filter wheel 124 can be collinear.

To allow each optical assembly to be mounted to an adjacent optical assembly in the stack, means for aligning the apertures of adjacent optical assemblies can be used. These means can be used in conjunction with the magnetic force forces on one or both of the adjacent optical assemblies to quickly mount and secure the adjacent optical assemblies to each other. Portions of the means for aligning the apertures of adjacent optical assemblies can be incorporated into each of the housings of the adjacent optical assemblies.

In one embodiment, the means for aligning the apertures of adjacent optical assemblies can comprise a plurality of first coupling portions positioned on one of the housings and a plurality of second coupling portions positioned on the other housing that are complementary to the first coupling portions so that when the optical assemblies are secured together, the second coupling portions couple with the first coupling portions.

Similar to the means for aligning the optical element with a viewing opening of the optical assembly receiver, discussed above, the first and second coupling portions can comprise mating tenon/mortise pairs, such as matching pins and holes.

For example, as shown in FIG. 10, adjacent filters 126a and 220 include a pin 260 and matching hole 220. Pin 260 and hole 222 are respectively positioned on the sides of filter 126a and filter 220 that face each other. As such, hole 222 can receive pin 260 when filters 126a and 220 are brought together and secured by the magnetic force of the filters.

If desired, both sides of the optical assembly can include portions of means for aligning adjacent optical assemblies such that the portions on each side of the optical assembly can be used to align with a different adjacent optical assembly. For example, hole 222 extends all the way through filter 220 so that hole 222 can be used as a mortise on both sides of filter 220. As such, hole 222 can be used as a portion of the means for aligning the apertures of adjacent optical assemblies (filters) 126a and 220 as well as a portion of the means for aligning the apertures of adjacent optical assemblies (filters) 220 and 126b. Similarly, filter 126b has pins 210 and 260 on opposite sides thereof; pins 210 can align with holes 222 of filter 220, while pins 260 can align with another filter on the opposite side of filter 126b. By continuing to add optical assemblies in this manner, any number of optical assemblies can be stacked up. The first optical assembly in the stack can be secured to the optical assembly receiver as discussed above, either before or after one or more other optical assemblies have been stacked onto the first optical assembly.

The mating tenon/mortise pairs of each optical assembly can be positioned so that the central axes of the apertures of the adjacent optical assemblies are aligned or collinear with each other when the adjacent optical assemblies are secured together. This can ensure that the optical elements are aligned when the optical assemblies are secured to the optical assembly receiver.

In one embodiment, two types of optical assemblies can be used in the stack. For example, as shown in FIG. 10 and discussed above, filters 126a and 126b each have pins 210 and 260 extending from opposing sides thereof, while filter 220 has a mating hole 220 extending completely therethrough. As such, a filter stack can be built by simply alternating the different types of filters 126 and 220, as shown in FIG. 10. Although the depicted embodiment only shows three stacked filters, any number of filters can be stacked using this alternating filter approach, although practical considerations may limit the number of filters in the stack.

Alternatively, a single type of optical assembly can be used in the stack, if desired. For example, a first optical assembly can have a tenon on one side surface and a mortise on the opposite side surface so that an optical assembly having the same configuration can be aligned with and secured to the first optical assembly. For example, FIG. 11 depicts an embodiment of a filter 270 having pins 272 extending from one side surface and holes 274 formed in the opposite side surface.

Pins 272 can be formed with or attached to housing 150 so as to align with holes 274. As a result, filters 270 can be stacked up with pins 272 of one filter 270 being received within holes 274 of an adjacent filter. Thus, the same type of filter can be used for each layer of the stack.

The means for aligning the apertures of adjacent optical assemblies can take many forms. The discussion of the various embodiments of the means for aligning the optical element with the viewing opening, discussed above, can also apply to the means for aligning the apertures of adjacent optical assemblies.

Adjacent optical assemblies can be mounted and secured to each other in a similar manner to that described above with respect to the mounting and securing of optical assemblies to the optical assembly receiver. An exemplary method of mounting and securing a pair of adjacent optical assemblies to each other will now be set forth with reference to FIG. 10.

The first step of the method comprises aligning the apertures of the adjacent optical assemblies so as to align mating coupling portions on the facing surfaces of the optical assemblies with each other.

Referring to FIG. 10, this step can be performed by positioning filter 220 adjacent filter 126a and rotating filter 220 with respect to filter 126a, if necessary, until mating pins 260 and holes 222 become aligned.

The second step of the method comprises while the first and second coupling portions are aligned, moving the optical assemblies closer to each other until the first coupling portions couple with the second coupling portions and a magnetic force secures the optical assembly to the optical assembly receiver. The magnetic force can originate with either or both of the optical assemblies. If desired, one or more recesses (e.g., recess 264) can be formed on one or both of the filters to accommodate magnets or any other projection extending from an adjacent filter.

Again referring to FIG. 10, this step can be performed by moving filter 220 closer toward filter wheel 126a, as indicated by arrows 266, until pins 260 are received within mating holes 222 and the magnetic force between magnets 200 on both filters causes filter 220 to be secured to filter 126a.

The above method can be performed for each optical assembly added to the stack.

To mount and secure the stacked optical assemblies to the optical assembly receiver, the first optical assembly in the stack can be mounted and secured to the optical assembly receiver using the method discussed above. The first optical assembly can be mounted and secured to the optical assembly receiver before or after other optical assemblies are mounted on the first optical assembly to form the stack.

The first step of the method comprises aligning an aperture of the optical assembly with a viewing opening of the optical assembly receiver so as to align first coupling portions on the optical assembly with mating second coupling portions on the optical assembly receiver.

In an alternative stacking embodiment, a portion of the means for aligning the apertures of the adjacent optical assemblies can be positioned on the optical assembly receiver. In one embodiment, tenons that are substantially longer than the width of each optical assembly can be positioned on the optical assembly receiver and corresponding mortises can extend completely through one or more optical assemblies so that each tenon can be received within more than one of the mortises of the stacked optical assemblies.

Figures 12A, 12B:
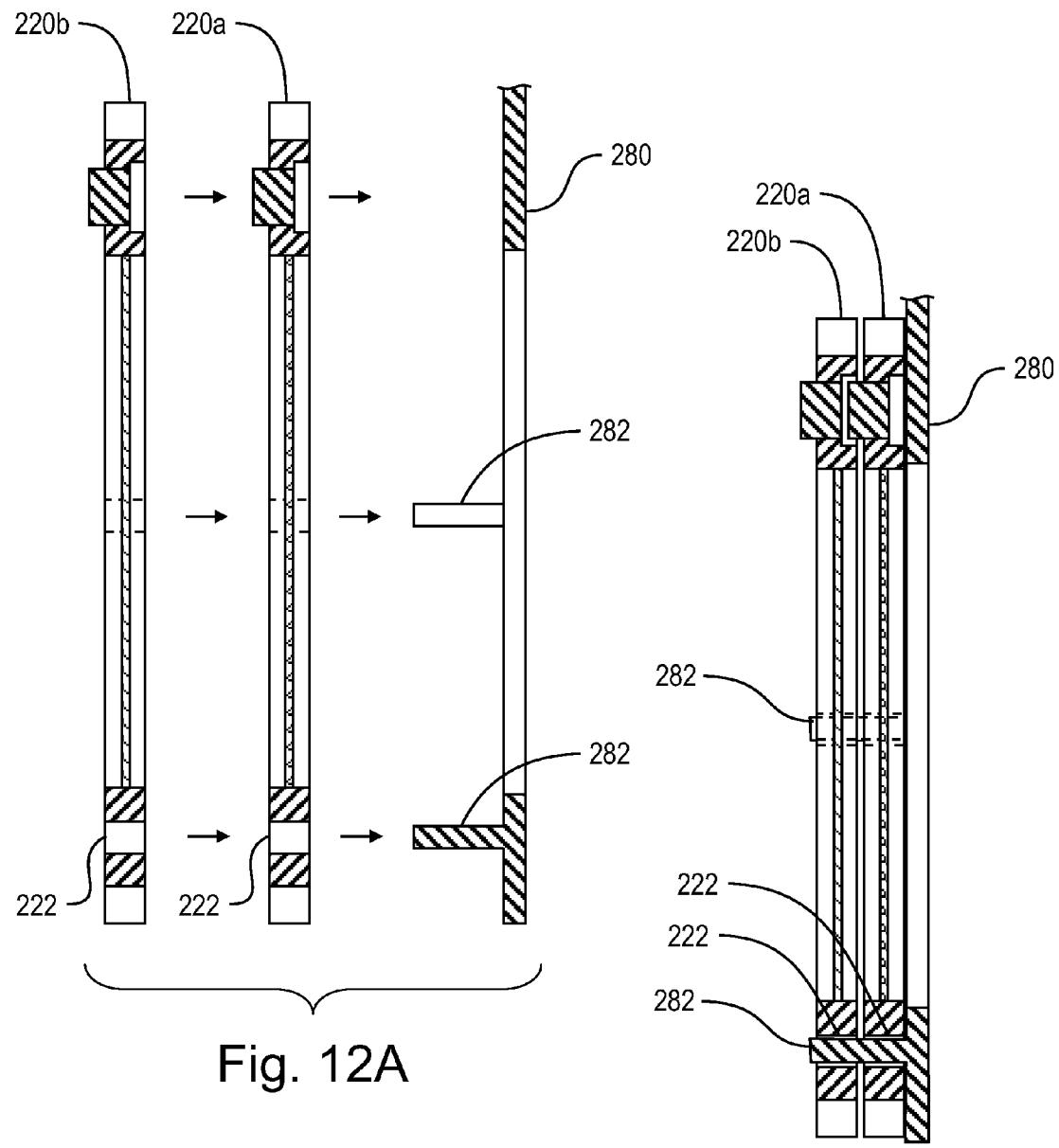
FIGS. 12A and 12B are cross sectional side views of an alternative embodiment of a stacked filter arrangement before and after mounting, respectively, on the filter wheel.

For example, FIGS. 12A and 12B depict an alternative embodiment of a filter wheel 280 that includes pins 282 formed on or attached to main body 128 that are substantially longer than the width of each filter 220. Because holes 222 of filters 220 extend completely through housing 150, pins 282 can extend completely through holes 222. Furthermore, because pins 282 are substantially longer than the width of each filter, filters 220 can be stacked so that pins 282 extend through aligned holes 222 of each filter 220 when filters 220 are mounted to filter wheel 280, as shown in FIG. 12B. The magnetic force of each filter 220 secures filters 220 to each other and to filter wheel 280. The number of filters 220 that can be stacked in this arrangement is limited by the length of pins 282.

Because a portion of the means for aligning the apertures of the adjacent optical assemblies can be positioned on the optical assembly receiver, the means for aligning the optical element of the optical assembly with a viewing opening of the optical assembly receiver and the means for aligning the apertures of adjacent optical assemblies can be combined to form a means for aligning apertures of adjacent optical assemblies with a viewing opening of the optical assembly receiver.

For example, the means for aligning apertures of adjacent optical assemblies with a viewing opening of the optical assembly receiver can comprise a plurality of tenons projecting from the main body of the optical assembly receiver, a plurality of mortises extending completely through a housing of a first optical assembly; and a plurality of mortises formed on a housing of a second optical assembly, such that when the first optical assembly, the second optical assembly, and the receiver are secured together, each of the tenons extends through one of the mortises of the first housing and into one of the mortises of the second housing.

Although the embodiments discussed above have been directed mostly to filters and filter wheels, respectively, as the optical assemblies and optical assembly receivers of the present invention, embodiments of the present invention can also be directed to other types of optical assemblies and optical assembly receivers.

Figure 13:
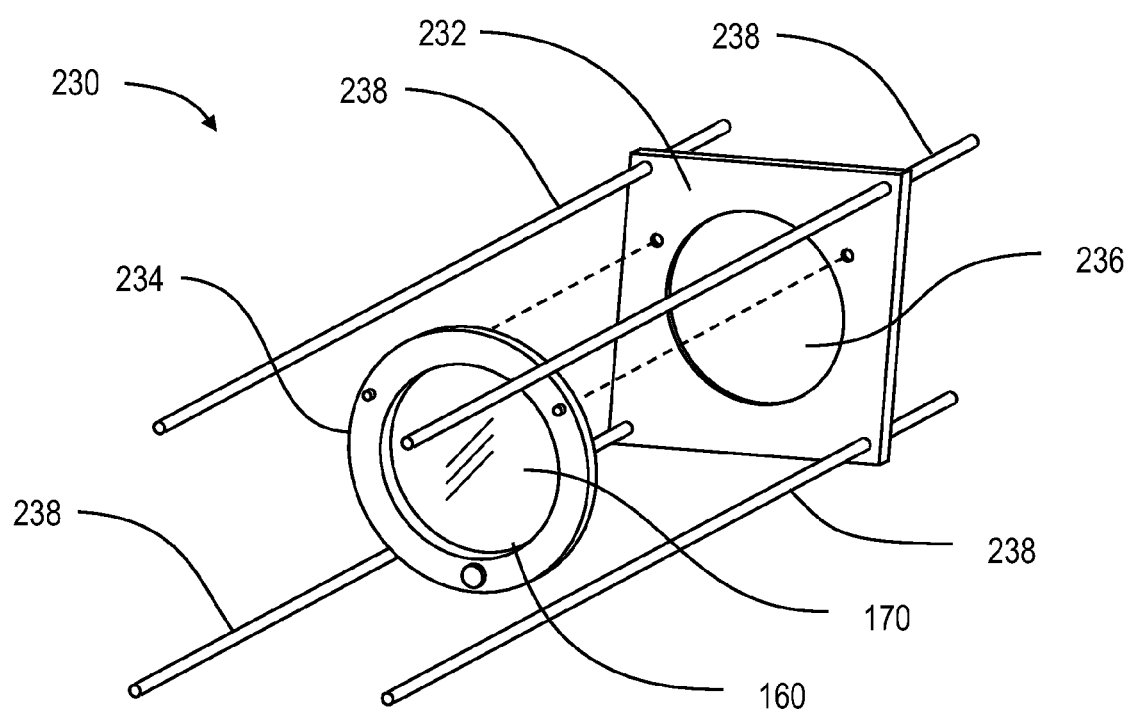
FIG. 13 is a perspective view of another embodiment of an optical apparatus.

For example, FIG. 13 shows an alternative embodiment of an optical apparatus 230 in which the optical assembly receiver comprises a cage back plate 232 and the optical assembly comprises a cage front plate 234 used in an optical cage. The general concept of optical cages is known in the art and will therefore not be discussed herein, except to say that the optical cage is used to align optical devices. Cage back plate 232 is similar to filter wheel 124 except that cage back plate 232 only has a single viewing opening 236 formed therethrough and is mounted within a cage using a plurality of rails 238. As such, cage back plate 232 does not rotate. Cage front plate 234 is similar to filter 126, except that optical element 170 positioned within aperture 160 is typically a lens or other type of optical element. Any of the methods discussed above can be applied to optical apparatus 230, adapting the methods where necessary based on the apparatus. For example, cage front plate 234 can be mounted to cage back plate 232 in any of the manners discussed above and secured thereto by a magnetic force. Furthermore, cage front plates 234 can be stacked on cage back plate 232 in a similar manner to that discussed above.

In addition, mirrors, achromatic doublets and triplet lens assemblies, prisms, fiber optic assemblies, objectives, and polychroic cube housings.

The present invention may be embodied in other specific forms without departing from its spirit or essential characteristics. Accordingly, the described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A filter wheel assembly comprising:
   a filter wheel comprising a main body bounding a plurality of viewing openings extending therethrough;
   a first optical assembly comprising:
      a first housing bounding an aperture extending therethrough; and
      a first optical element secured to the first housing so as to be positioned within or aligned with the aperture, the first optical assembly being secured to the filter wheel at a first one of the viewing openings by a first magnetic force between the first optical assembly and the filter wheel; and
   means for aligning the aperture of the first optical assembly with the first viewing opening, comprising:
      a plurality of first coupling portions positioned adjacent the first viewing opening of the main body; and
      a plurality of second coupling portions positioned on the first housing that are complementary to the first coupling portions so that when the first optical assembly is secured to the filter wheel, the second coupling portions couple with the first coupling portions.

2. The filter wheel assembly recited in claim 1, further comprising a first magnet positioned on the first housing or the main body to provide the magnetic force.

3. The filter wheel assembly recited in claim 1, wherein the aperture of the first optical assembly is aligned with the first viewing opening when the first optical assembly is secured to the filter wheel.

4. The filter wheel assembly recited in claim 1, wherein the first and second coupling portions comprise mating tenons and mortises.

5. The filter wheel assembly recited in claim 4, wherein for each complementary first and second coupling portion:
   the tenon comprises a pin positioned on the main body or the first housing; and
   the mortise forms a hole on the other of the main body or the first housing, the hole being configured to receive the pin.

6. The filter wheel assembly recited in claim 4, wherein at least one of the mortises extends completely through the main body or the first housing.

7. The filter wheel assembly recited in claim 1, further comprising a second optical assembly securable to the filter wheel at a second one of the viewing openings by a second magnetic force between the second optical assembly and the filter wheel, the first and second optical assemblies being securable to the filter wheel concurrently.

8. An imaging system comprising:
   a microscope assembly comprising one or more objectives;
   a stage assembly mounted on the microscope assembly; and
   a filter wheel assembly as recited in claim 1 optically coupled with the microscope assembly.

9. An optical apparatus comprising:
   an optical assembly receiver comprising a main body bounding a viewing opening extending therethrough;
   a first optical assembly comprising:
      a first housing bounding a first aperture extending therethrough; and
      a first optical element secured to the first housing so as to be positioned within or aligned with the first aperture; and
   a second optical assembly comprising:
      a second housing bounding a second aperture extending therethrough; and
      a second optical element secured to the second housing so as to be positioned within or aligned with the second aperture;
   wherein the first optical assembly is securable to the optical assembly receiver and the second optical assembly is securable to the first optical assembly by a magnetic force, such that when the first optical assembly, the second optical assembly, and the optical assembly receiver are secured together, the first aperture and the second aperture are aligned with the viewing opening.

10. The optical apparatus recited in claim 9, wherein the first aperture has a first central axis, the second aperture has a second central axis, and the viewing opening has a third central axis, and wherein when the first optical assembly, the second optical assembly, and the optical assembly receiver are secured together, the first central axis, the second central axis and the third central axis are collinear.

11. The optical apparatus recited in claim 9, further comprising a magnet positioned on the first housing to provide the magnetic force.

12. The optical apparatus recited in claim 9, further comprising:
   means for aligning the first aperture of the first optical assembly with the viewing opening; and
   means for aligning the second aperture of the second optical assembly with the first aperture of the first optical assembly.

13. The optical apparatus recited in claim 12, wherein the means for aligning the first aperture of the first optical assembly with the viewing opening comprises:
   mating tenons and mortises positioned on the first optical assembly and the optical assembly receiver such that when the first optical assembly is secured to the optical assembly receiver, the mating tenons and mortises couple with each other.

14. The optical apparatus recited in claim 12, wherein the means for aligning the second aperture of the second optical assembly with the first aperture of the first optical assembly comprises:
   mating tenons and mortises positioned on the first optical assembly and the second optical assembly such that when the first optical assembly is secured to the second optical assembly, the mating tenons and mortises couple with each other.

15. The optical apparatus recited in claim 9, further comprising means for aligning the first and second apertures of the first and second optical assemblies with the viewing opening of the optical assembly receiver, the means for aligning comprising:
   a plurality of tenons projecting from the main body of the optical assembly receiver;
   a plurality of mortises extending completely through the first housing; and
   a plurality of mortises formed on the second housing, such that when the first optical assembly, the second optical assembly, and the receiver are secured together, each of the tenons extends through one of the mortises of the first housing and into one of the mortises of the second housing.

16. The optical apparatus recited in claim 9, wherein the optical element comprises an optical lens or an optical filter.

17. A method comprising:
   aligning an aperture of a first optical assembly with a first viewing opening of a filter wheel so as to align first coupling portions on the first optical assembly with mating second coupling portions on the filter wheel, the first optical assembly having a first optical filter element positioned thereon; and while the first and second coupling portions are aligned, moving the first optical assembly closer to the filter wheel until the first coupling portions couple with the second coupling portions and a first magnetic force secures the first optical assembly to the filter wheel.

18. The method recited in claim 17, wherein the first optical assembly is secured to the filter wheel without the use of tools.

19. The method recited in claim 17, further comprising manually removing the first optical assembly from the filter wheel without any tools.

20. The method recited in claim 17, wherein the first and second coupling portions comprise tenons and mortises and coupling of the first and second coupling portions comprises receiving the tenons within the mortises.

21. The method recited in claim 17, further comprising:

aligning an aperture of a second optical assembly with a second viewing opening of the filter wheel so as to align third coupling portions on the second optical assembly with mating fourth coupling portions on the filter wheel, the second optical assembly having a second optical filter element positioned thereon; and while the third and fourth coupling portions are aligned, moving the second optical assembly closer to the filter wheel until the third coupling portions couple with the fourth coupling portions and a second magnetic force secures the second optical assembly to the filter wheel.

22. A method comprising:

aligning a first aperture of a first optical assembly with a viewing opening of an optical assembly receiver so as to align first coupling portions on the first optical assembly with mating second coupling portions on the optical assembly receiver, the first optical assembly having a first optical filter element positioned within the first aperture;

while the first and second coupling portions are aligned, moving the first optical assembly closer to the optical assembly receiver until the first coupling portions couple with the second coupling portions and a magnetic force secures the first optical assembly to the optical assembly receiver;

aligning a second aperture of a second optical assembly with the first aperture of the first optical assembly so as to align third coupling portions on the second optical assembly with mating fourth coupling portions on the first optical assembly, the second optical assembly having a second optical filter element positioned within the second aperture; and while the third and fourth coupling portions are aligned, moving the second optical assembly closer to the first optical assembly until the third coupling portions couple with the fourth coupling portions and a magnetic force secures the second optical assembly to the first optical assembly such that when the optical assembly receiver, the first optical assembly, and the second optical assembly are secured together, the first and second apertures are aligned with each other and with the aperture of the optical assembly receiver.

23. The method recited in claim 22, wherein the second optical assembly is secured to the first optical assembly before the first optical assembly is secured to the optical assembly receiver.

24. The method recited in claim 22, wherein the first and second, third, and fourth coupling portions comprise tenons and mortises and wherein coupling of the first and second coupling portions and coupling of the third and fourth coupling portions comprises receiving the tenons within the mortises.

25. The method recited in claim 22, wherein the first coupling portions and third coupling portions are combined and comprise tenons projecting from the optical assembly receiver;

the second coupling portions comprise mortises extending completely through the first optical assembly; and the fourth coupling portions comprise mortises extending into the second optical assembly, such that when the first optical assembly, the second optical assembly, and the optical assembly receiver are secured together, each of the tenons extends through one of the mortises of the first housing and into one of the mortises of the second housing.

* * * * *